Aug. 7, 1934.  M. F. SMITH ET AL  1,969,432
WATER METER YOKE
Filed Dec. 26, 1928  3 Sheets-Sheet 2
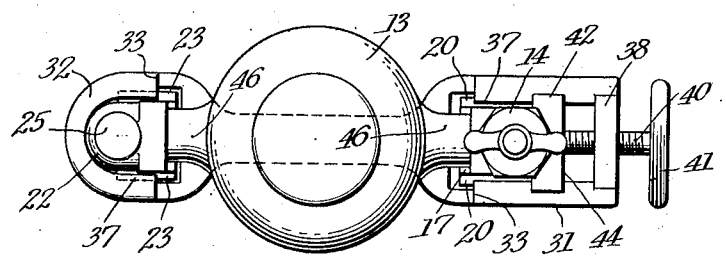
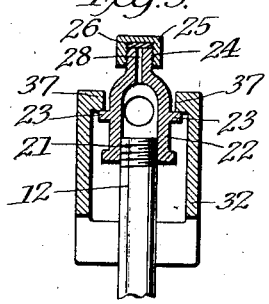 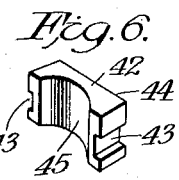 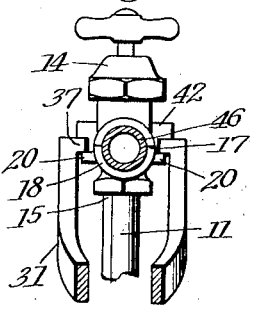
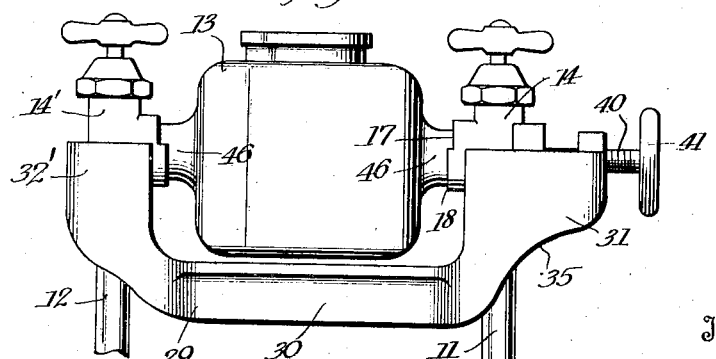
Inventors
M. F. Smith
E. M. Reedy
By Cushman, Bryant Darby
Attorneys

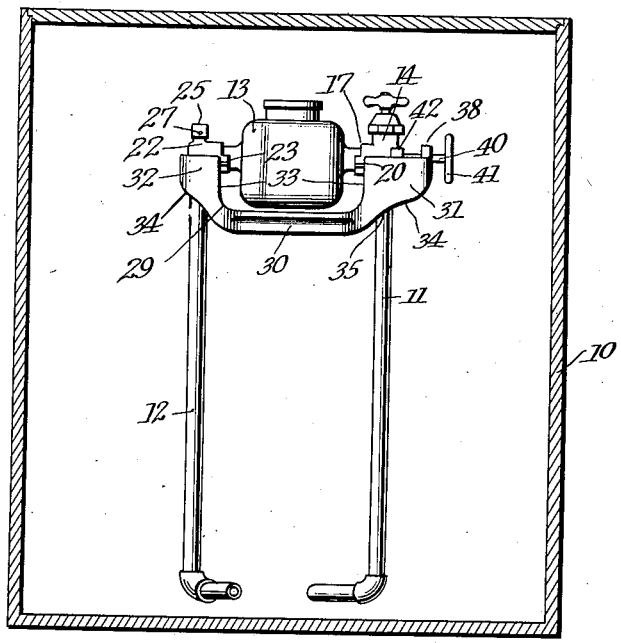
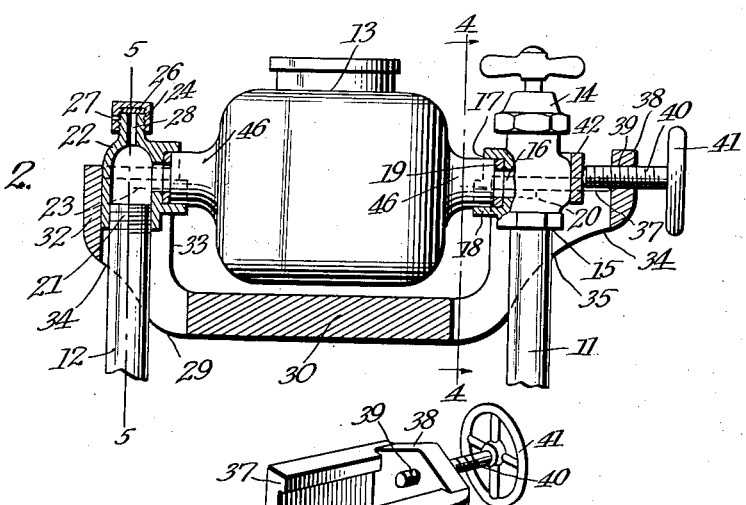
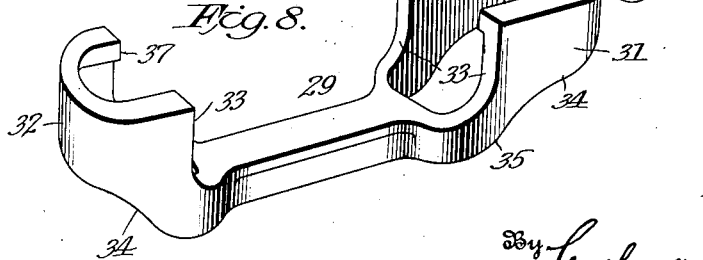

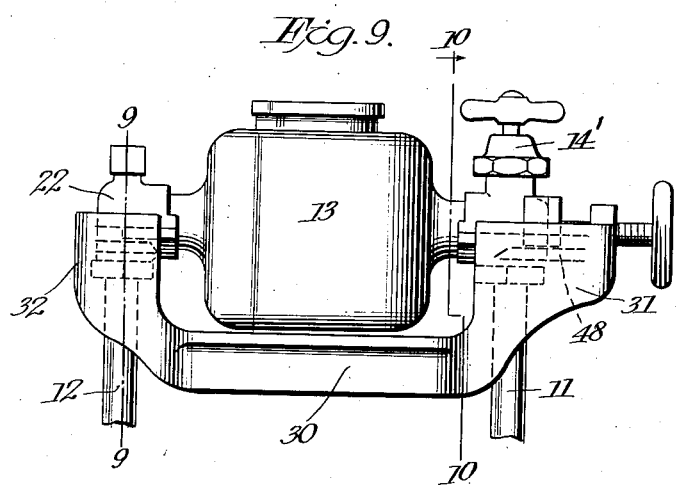
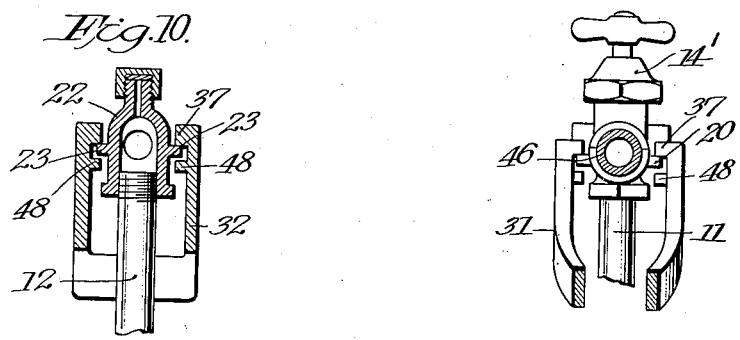
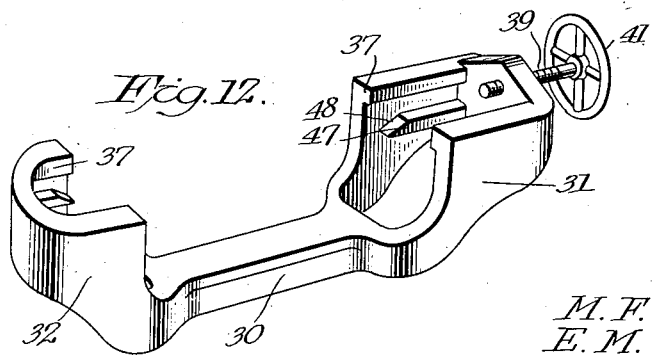

Patented Aug. 7, 1934

1,969,432

UNITED STATES PATENT OFFICE 1,969,432

WATER METER YOKE

Marion F. Smith and Emmett M. Reedy, Decatur, Ill., assignors to Mueller Co., Decatur, Ill., a corporation of Illinois Application December 26, 1928, Serial No. 328,560

21 Claims. (Cl. 73—167)

This invention relates to meter supports or hangers, and aims to overcome many defects and obstacles at present experienced with the usual constructions of this character, and constitutes a continuation in part of our pending application Serial No. 235,880, filed November 26, 1927.

It is desirable to have a construction with as few parts as possible, not only to reduce costs, but as well to provide a simple and rigid support.

It is, furthermore, desirable to have the weight so balanced that breakage will not readily be possible under normal use, the strains being distributed throughout the support.

It is, furthermore, desirable in a construction of this kind that a supporting yoke be employed which can be placed in position over the risers and the meter supporting sockets connected to the risers after all connections have been completed.

In constructions of this character, it has been common to place valves at the inlet and outlet ports, but I have also found it desirable to utilize a testing valve at the outlet port so that regardless of whether the meter is registering accurately or not, it may be determined whether water is flowing through the meter.

The invention does away with any connecting means whatsoever on the yoke, and any interposed connections, the meter supporting sockets being formed on the valves which are directly connected to the risers.

In the drawings:

Figure 1 is a side view.
Figure 2 is a view partly in section.
Figure 3 is a top plan view.
Figure 4 is a view on the line 4—4 of Fig. 2.
Figure 5 is a view on the line 5—5 of Fig. 2.
Figure 6 is a detail, and
Figure 7 is a modification.
Figure 8 is a perspective view of the yoke.
Figure 9 is a view similar to Fig. 2 showing a modification of the invention.
Figure 10 is a view on the line 9—9 of Fig. 9.
Figure 11 is a view on the line 10—10 of Fig. 9.
Figure 12 is a perspective view of the modified yoke.

In the drawings, the numeral 10 indicates the meter box usually placed in the ground, into which pass service pipes 11 and 12, one of which leads from the street main, and the other to the house connections through the meter.

The meter is indicated at 13 and is of conventional form.

Referring to Figure 2, it will be seen that I connect to the vertical riser 11, which may be the inlet pipe, a valve 14 of any suitable construction, such valve, however, being of the usual stop cock variety. This valve is threaded to the riser for vertical adjustment as at 15, and is provided with an outlet 16 leading to the meter. The outlet end of the valve is cut away at the upper portion of its barrel as at 17 to form a socket, the lower portion 18 of the barrel thereby being of greater length than the upper portion.

Fitted within the outlet end of the valve is a suitable packing member 19.

Referring to Figure 4, it will be seen that the body of the valve 14 is provided with lateral outwardly extending flanges 20 extending along the sides of the valve body and formed a slight distance below the edge of the cut away portion of barrel socket.

The outlet pipe 12 has adjustably threaded thereon as at 21, a connection 22, provided with a similar packing and socket, as described in connection with the valve 14. This connection is likewise provided with lateral flanges 23, as shown in Fig. 5, similar to the flanges 20 on the valve 14.

The connection 22 at its upper end is provided with a tubular projection threaded as at 24 to receive a threaded cap 25. This cap 25 has a packing 26 in its upper end, and is interiorly screw-threaded, and in its wall is formed with a hole 27, this structure forming a valve.

The purpose of the valve 14 is to cut off the supply of water to the meter, and the purpose of the valve in the connection 22 is to determine whether or not water is flowing through the meter, should the meter register inaccurately.

In order to accomplish this latter object, if the valve cap be unscrewed so as to establish communication between the passage 28 in the upper end of the valve, and the hole 27, and water is discharged through the hole 27, it will be determined that water is passing through the meter. In the normal position of the parts, however, the valve cap is screwed down with its packing 26 fitting the upper end of the threaded portion of the valve to form a tight joint.

The hanger or yoke employed is indicated as a whole at 29 in Figure 8. This yoke or hanger is of peculiar form, as will be understood upon reference to the drawings, and is made preferably as a single casting. This casting comprises a base portion 30 which is enlarged at its ends, and is provided with an upwardly and laterally extending portion 31 and an upwardly extending portion 32. The portions 31 and 32, as shown in Figure 8, are considerably larger in width than the base 30 and are made hollow.

It will be noted that the interior walls of the hollow portions are relatively straight, as shown at 33, merging into the base 30. The exterior walls are, however, inclined, as in the case of the portion 32, as shown at 34, and inclined on a curve, as shown at 35 in the case of the portion 31. By this construction and the general construction of the yoke, there is provided a relatively flat base 30 extending beneath and spaced from the meter 13, and a space between the walls or edges 33 on the interior of the yoke for receiving the body of the meter. The interior side walls and end walls of the hollow portions are relatively straight in the case of the portion 31, while in the case of the portion 32, the end wall is curved. This construction may, however, be departed from in accordance with the exigences of a particular installation.

The upper edges of the hollow portions are provided with inwardly extending flanges 37, as shown in Figures 4, 5 and 8. The portion 31 has its end wall extended upwardly slightly as shown at 38, and this end wall is formed with a screw threaded opening 39 receiving a suitable screw threaded member 40 having an operating handle 41.

Slidably mounted upon the flanges 37 of the portion 31 is a member 42 shown in detail in Figure 6, which member is provided with aligned recesses 43 in its opposite sides. The member 42 has a straight end 44, and its other end is inwardly curved as shown at 45.

This member 42 is positioned upon the yoke by causing its recesses 43 to receive the flanges 37, whereby the member 42 may slide freely in the yoke upon the said flanges. The free end of the threaded member 40 engages the straight side or back of the member 42, and therefore, by turning the handle, the member 42 may be adjusted upon the yoke.

The assembly of the device is very simple and constitutes a departure from the previous expedients, in that it is both rapid and may be accomplished with ease and without the necessity of skilled mechanics.

Thus, the valves 14 and 22 are secured to the risers, with their open socket portions extending toward each other.

The member 42 is placed in the yoke and the screw or threaded member 40 drawn back as far as possible, so that the member 42 may rest against the end of the yoke portion 31.

Thereupon the yoke is dropped down, and by reason of the sides and construction of the hollow portions, the valves may pass therethrough. The flanges 37 upon the upper edges of the yoke come into alignment with the flanges 20 formed upon the valve members, and in this manner the flanges 20 support the yoke in position. This is shown in detail in Figures 4 and 5, as well as in Figure 3. By this construction, the valves can be attached to the riser, and the yoke lowered thereover without the necessity of employing connections on the yoke or additional connections between the valve and the riser.

When the yoke has been positioned with its flanges 37 engaging the flanges 20, the meter is dropped into position with its spuds 46 engaged in the sockets 17—18 of the valves, which will serve to support the meter. Obviously, a tight joint is desired, and this is accomplished by now turning the screw 40 which will cause the curved wall 45 of the member 42 to engage the adjacent portion of the valve 14 and push it toward the meter and toward the valve 22. In this manner, the spuds will be tightly drawn against the valves and the packing 19 therein to provide a tight joint.

It will be understood that the hollow portions of the upstanding ends of the yoke, as shown in Fig. 2, are of sufficient extent to permit not only the valves to pass upward and downward therethrough, but incidentally to permit the risers to be adjusted or moved longitudinally therein, which risers carry the valves supporting the meter.

It will be understood that in some cases a valve of the test type, as shown at 22, will not be desired, and a stop cock valve similar to the valve 14 may be employed for both the inlet and outlet. This construction is shown in Figure 7. A stop cock 14' is shown in this view, and it will be understood that the portion 32' may remain unchanged by having the stop cock 14' of a size substantially the same as the valve 22, whereby no change in the size of casting will be required. On the other hand, it will be possible to cast the yokes with ends of any desired size, and to make the end portions of equal size, large or small, if desired.

It will be understood that the hollow portions of the yoke member are disposed above the base 30 and at the side thereof, and that in this manner it will be possible to place them over the valves connected to the riser while at the same time, the base 30 will be supported below the meter and in such a manner that when the meter is supported in the sockets, the strain will be equally distributed over all of the parts.

Various modifications may be made in the construction without departing from the spirit of the invention, as set forth in the claims.

It is to be noted that in providing the enlarged openings in the ends of the yoke, that the valves and risers will be guided in both their vertical and horizontal movements by the walls of the yoke. This will assist in properly aligning the parts and assure their accurate positioning.

Referring to Figures 9 to 12 of the drawings, it will be noted that the enlarged hollow ends of the yoke are provided with interior flanges 47 which extend parallel with the flanges 37 but terminate short of the flanges 37, and the inner edge of the walls defining the enlarged opening.

These flanges are shown as having a bevelled portion 48 which may or may not be desirable.

The additional inwardly directed flanges 47 are considered desirable in cases where the riser pipes are made of material which is very flexible, such as copper, as distinguished from rigid castings of iron. It has been found that with copper risers the question of the flexibility of the copper pipe renders it difficult to hold the valves 14 and 22 in the proper position for receiving the meter spuds. Therefore, when the flanges 20 and 23 of the said valves are inserted between the flanges 37 and 42, the copper risers do not have so great a tendency to bend or tip forward.

It will be understood, however, that where the risers are made of iron or other rigid material, there is no necessity for the additional flanges 47 because the risers will not be flexible, and hence there is no need to sustain or guide the valves.

In order to assemble the construction, the valve 14 is connected to the riser as heretofore described and then inserted through the enlarged end or hollow portion of the yoke, the opening being sufficiently large to permit the valve to pass and due to the clearance provided by the relatively short flanges 47, readily permitting the valve to be inserted and its flanges 20 engaged between the upper and lower flanges 37 and 47. The valve 22 or the valve 14', as the case may be, is connected to its riser 12, and the riser is sprung forward and passed through the adjacent hollow portion of the yoke whence it will then be forced into engagement with the flanges 37 and 47.

If this means of assembly is not the most convenient, the risers can be projected through the yoke and the valves connected thereto and then sprung towards each other so as to permit the flanges upon the valves to engage between the flanges formed on the yoke.

It will be seen that in connection with flexible pipes such as are made of copper, the flanges 47 will tend to sustain the valves in a proper position to receive the meter spuds whereas if such flanges were not provided with flexible piping, there might occur a tendency to bend or tip.

The flanges 47 serve not only as the sustaining means, but are also a guiding means. In this connection, they supplement the guide structure which is accomplished by means of the flanges 37 and the flanges which are formed upon the respective valves.

The purpose of the modified construction in connection with risers of flexible material is to make absolutely positive that the joint between the connections and the meter spuds shall be leak-proof.

What we claim is:

1. In a meter support, meter supporting connections, a yoke having a base and provided with openings adjacent said base, projections formed on said yoke, said connections adapted to loosely extend through said openings and having projections thereon, whereby the yoke may be positioned by passing said connections through said openings, the passage of the connections through the openings being limited by the engagement of the projections on the yoke and connections, serving to support the yoke with its base disposed below a meter.

2. In a meter support for a meter having spuds, risers, valves connected to the risers, said valves having means to engage a meter to form a tight joint with the spuds thereof and support the meter, a yoke having openings and a base, said valves adapted to extend through said openings and support the yoke, one of said valves being adjustable within the yoke toward or from the adjacent meter spud, the yoke being positioned and supported by passing the valves through said openings with the meter supported above the base of the yoke.

3. In a meter support, risers, connections from the risers to the meter, a yoke having openings at its ends through which said connections extend, said yoke having inwardly extending flanges, and said connections having outwardly extending flanges, the several flanges slidably interengaging to support the yoke and sustain the connections in leakproof engagement with the meter.

4. In a meter support, risers, connections from the risers to the meter, a yoke having enlarged openings at its ends through which said connections extend, said yoke being provided with parallel inwardly extending flanges, and said connections having flanges slidably interengaging the flanges of the yoke for supporting the yoke and guiding and sustaining the connections.

5. In a meter support, risers, connections from the risers to the meter, a yoke having enlarged openings at its ends through which said connections extend, parallel flanges arranged one above the other formed on said yoke, flanges formed on said connections, the flanges on said connections interengaging with the flanges on said yoke for supporting the yoke and sustaining the connections in position.

6. In a meter support, risers, connections from the risers to the meter, a yoke having enlarged openings at its ends through which said connections extend, spaced parallel flanges arranged upon opposite walls of the enlarged openings one above the other, one of said flanges of each pair being shorter with relation to the other, and flanges formed on said connections and interengaging between said flanges on the yoke to support the meter and sustain the connections.

7. In a meter support, an elongated one-piece yoke of substantial U-form having enlarged vertically extending openings in its legs, supporting means for the yoke extending through said openings and having lugs formed thereon engaging the yoke and providing seats for detachably supporting the yoke in position.

8. In a meter support, an elongated one-piece yoke consisting of an intermediate base portion and upwardly extending legs having enlarged vertically and longitudinally extending openings therein, supporting means for the yoke and for a meter, said means extending through said openings and adapted to move therein longitudinally of the yoke.

9. In a meter support, an elongated one-piece yoke having enlarged vertically and longitudinally extending openings in its ends, supporting means for the yoke and for a meter, said means extending through said openings and adapted to move therein longitudinally of the yoke, and internally projecting means formed in the walls of said openings for guiding the longitudinal movement of the supporting means.

10. In a meter support, risers, valves connected to the risers, an elongated one-piece yoke having an opening in each leg extending into the bight, said valves adapted to extend through said openings and having means formed thereon to support the yoke, whereby the yoke may be positioned by passing said valves vertically through said openings, with the bight disposed below a meter.

11. In a meter support, risers, a meter having spuds, valves connected to the risers and having means for engaging the spuds of the meter to provide a tight joint and support the meter, an elongated one-piece yoke having an opening in each leg extending into the bight, said valves adapted to extend through said openings and having means formed thereon to support the yoke, whereby the yoke may be positioned by passing said valves vertically through said openings, with the bight of the yoke disposed below the meter.

12. In a meter support, meter supporting connections, an elongated one-piece yoke having a base and provided with openings, projections formed on said yoke, said connections adapted to extend through said openings and having projections thereon, whereby the yoke may be positioned by passing said connections through said openings, the passage of the connections through the openings being limited by the engagement of the projections on the yoke and connections, serving to support the yoke with its base disposed below a meter.

13. In a meter support, risers, valves connected to the risers, an elongated one-piece yoke having an opening in each leg extending into the bight, said valves adapted to extend through said openings and having means formed thereon to support the yoke, one of said valves being a stop cock, and the other being a flow testing valve, the yoke being positioned and supported by passing the valves through said openings with the bight disposed below a meter.

14. In a meter support, risers, connections from the risers to the meter, an elongated one-piece yoke having openings at its ends through which said connections extend, said yoke having inwardly extending flanges, and said connections having outwardly extending flanges, the several flanges interengaging to support the yoke and guide the connections.

15. In a meter support, risers, a single connection between the risers and the meter, a substantially U-shaped yoke formed in one piece and adapted to be detachably supported by said connections and having openings in its legs through which said connections are adapted to loosely extend, and lugs on said yoke loosely engaging said connections to support the yoke and permitting sliding adjusting movement of said connections with respect to said yoke.

16. In a meter support, risers, a single connection between the risers and the meter, a substantially U-shaped yoke formed in one piece and adapted to be detachably supported by said connections and having a base and upwardly extending portions at its ends, said portions being provided with enlarged flared openings through which said connections loosely extend, and means on the yoke loosely engaging said connections.

17. In a meter support, risers, a single connection between the risers and the meter, a substantially U-shaped yoke formed in one piece and adapted to be detachably supported by said connections and having a base and upwardly extending portions at its ends, said portions being provided with enlarged openings through which said connections extend, said connections being movable within said openings and guided in such movement by the yoke, and means on the yoke loosely engaging said connections to support the yoke.

18. In a meter support, risers, connections from the risers to the meter, a substantially U-shaped yoke having openings in its legs through which said connections extend, and interengaging means on said yoke and connections for loosely and detachably supporting the yoke in position and permitting bodily longitudinal and vertical adjustment of said yoke relative to said connections.

19. In a meter support, a substantially U-shaped yoke consisting of an intermediate base portion and upwardly extending legs having openings therein, and longitudinally extending internal guide lugs on the walls of said openings.

20. In a meter support, a substantially U-shaped yoke consisting of an intermediate base portion and upwardly extending legs having openings therein, and opposed pairs of longitudinally extending internal guide lugs on the walls of said openings.

21. In a meter support, a substantially U-shaped yoke consisting of an intermediate base portion and upwardly extending legs having openings therein, and aligned longitudinally extending internal guide channels in the walls of each of said openings.

MARION F. SMITH.
EMMETT M. REEDY.